(12) United States Patent
Rao et al.

(10) Patent No.: US 10,080,105 B2
(45) Date of Patent: Sep. 18, 2018

(54) SYSTEM AND METHOD FOR MANAGING MOBILE VIRTUAL MACHINE TYPE COMMUNICATION DEVICES

(71) Applicants: Jaya Rao, Ottawa (CA); Sophie Vrzic, Kanata (CA); Xu Li, Nepean (CA)

(72) Inventors: Jaya Rao, Ottawa (CA); Sophie Vrzic, Kanata (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/178,155

(22) Filed: Jun. 9, 2016

(65) Prior Publication Data

US 2017/0359693 A1    Dec. 14, 2017

(51) Int. Cl.
*H04W 24/00* (2009.01)
*H04W 4/02* (2018.01)
(Continued)

(52) U.S. Cl.
CPC .......... *H04W 4/028* (2013.01); *H04W 4/029* (2018.02); *H04W 4/70* (2018.02); *H04W 48/20* (2013.01);
(Continued)

(58) Field of Classification Search
CPC ... H04W 4/028; H04W 4/005; H04W 64/003; H04W 48/20; H04W 88/16
See application file for complete search history.

(56) References Cited

U.S. PATENT DOCUMENTS

2013/0222115 A1*  8/2013  Davoodi .................. H04Q 9/00
                                                          340/10.1
2015/0296404 A1* 10/2015  Sharma ............. H04W 28/0215
                                                          370/230
(Continued)

FOREIGN PATENT DOCUMENTS

WO    2014161503 A1    10/2014
WO    2014203206 A1    12/2014
WO    2015070902 A1     5/2015

OTHER PUBLICATIONS

Fu et al., "Group Mobility Management for Large-Scale Machine-to-Machine Mobile Networking," IEEE Transactions on Vehicular Technology, vol. 63, No. 3, pp. 1296-1305, Mar. 2014.
(Continued)

*Primary Examiner* — Ajit Patel

(57) ABSTRACT

The present invention provides a system and method for managing a mobile object using a plurality of machine type communication devices (MTCDs) communicatively connected to a communication network. A mobile object can be considered a virtual MTCD which can be managed and/or tracked by an array of MTCDs which are communicatively connected with the communication network. The MTCDs detect the mobile object and obtain or determine one or more parameters indicative of movement of the object. By tracking the movement of the object, the system can substantially ensure that there are connected MTCDs in the area to which the object is moving, thereby enabling the management and/or tracking of the mobile object can be provided by actively modifying the configuration of the communication network, for example using network function virtualization.

12 Claims, 17 Drawing Sheets

(51) Int. Cl.
*H04W 48/20* (2009.01)
*H04W 64/00* (2009.01)
*H04W 4/029* (2018.01)
*H04W 4/70* (2018.01)
*H04W 88/16* (2009.01)

(52) U.S. Cl.
CPC .......... *H04W 64/003* (2013.01); *H04W 88/16* (2013.01)

(56) References Cited

U.S. PATENT DOCUMENTS

| | | | |
|---|---|---|---|
| 2016/0050626 A1 | 2/2016 | Chen et al. | |
| 2016/0142245 A1 | 5/2016 | Kurz | |
| 2016/0183059 A1* | 6/2016 | Nagy | H04W 4/029 455/456.5 |
| 2016/0255420 A1* | 9/2016 | McCleland | H04Q 9/00 340/870.07 |
| 2016/0330613 A1* | 11/2016 | Cook | G06F 9/45558 |
| 2016/0345167 A1* | 11/2016 | Li | H04W 8/04 |
| 2016/0345222 A1* | 11/2016 | Axmon | H04W 36/0016 |
| 2016/0353313 A1* | 12/2016 | Reyes | H04W 28/0215 |
| 2016/0366620 A1* | 12/2016 | Royon | H04L 67/10 |
| 2017/0118616 A1* | 4/2017 | Kothari | H04W 4/24 |
| 2017/0142560 A1* | 5/2017 | Ryu | H04W 68/02 |
| 2017/0150399 A1* | 5/2017 | Kedalagudde | H04W 28/08 |
| 2017/0164301 A1* | 6/2017 | Jeon | H04W 52/243 |

OTHER PUBLICATIONS

ETSI GS NFV 001 entitled "Network Function Virtualization (NFV); Use Cases", Oct. 2013.
ETSI GS NFV 002 entitled "Network Function Virtualization (NFV); Architectural Framework", Oct. 2013.
International Search Report dated Sep. 6, 2017 for corresponding International Application No. PCT/CN2017/087389 filed Jun. 7, 2017.

* cited by examiner

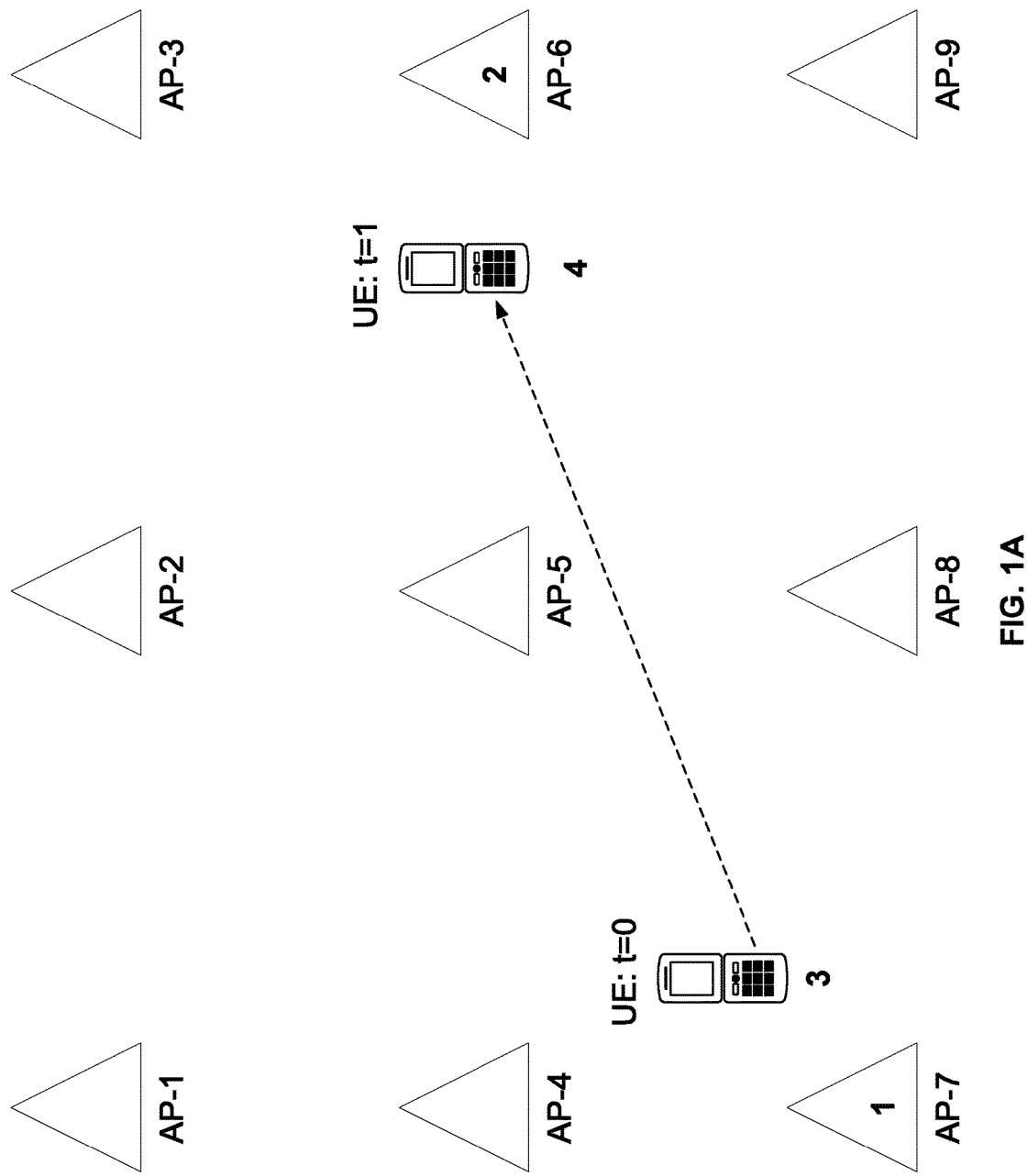

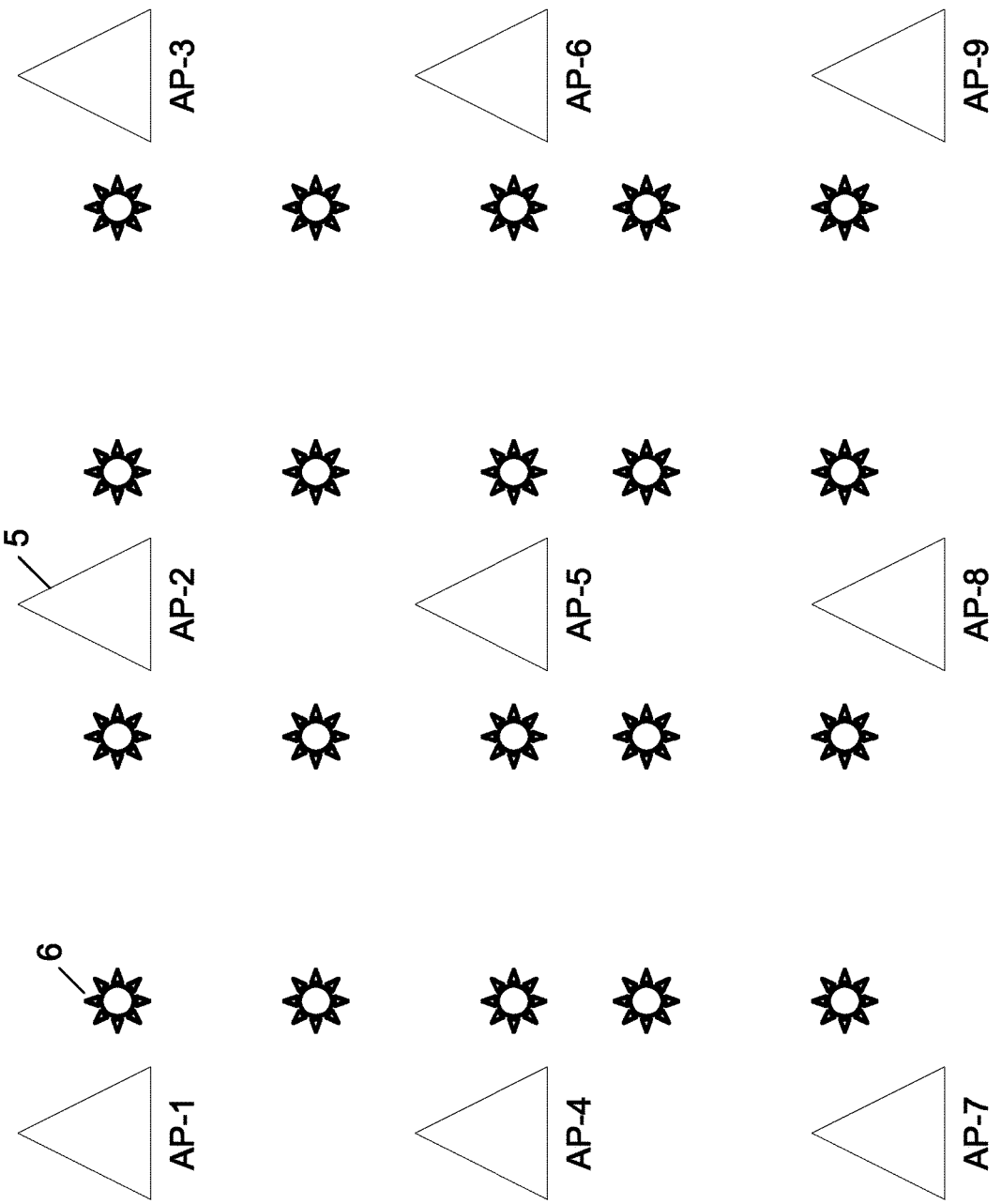

SYSTEM AND METHOD FOR MANAGING MOBILE VIRTUAL MACHINE TYPE COMMUNICATION DEVICES

FIELD OF THE INVENTION

The present invention pertains to the field of communication networks and in particular to a system and method for managing mobile virtual machine type communication devices (MTCDs).

BACKGROUND

Today typically communication systems can be configured to provide wireless communication for varying types of communication devices, for example providing mobile broad band communications and also providing machine type communications.

For mobile broad band communication, service can be provided to mobile User Equipment (UE) through the management and handover between Access Points (AP) which provide connectivity of the UE with the communication network. This configuration is illustrated in FIG. 1A, wherein at a first location 3 at time t=0 the UE is communicatively connected via AP-7 1 and subsequently the UE moves to a second location 4 at time t=1 and the UE can be communicatively connected with AP-6 2. As such handover of the connectivity of the UE is provided between AP-7 and AP-6 to ensure continual connectivity of the UE to the communication network independent of the movement of the UE.

Typically for machine type communication, service can be provided to an array of typically stationary Machine Type Communication Devices (MTCDs) that can be deployed in order to capture or sense attributes in the physical environment or transmit collected data. For example the MTCDs can provide for the sensing of temperature or pressure, or transmitting data collected that relates to electrical usage. MTCDs are typically static and communication services are typically provided to these MTCDs 6 via proximate APs 5. FIG. 1B.

However, in instances where what is being captured or sensed in the physical environment is mobile, neither of these communication network configurations can provide the desired functionality. Therefore there is a need for a system and method for managing and tracking mobile objects using a communication network, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present invention provides a system and method for managing mobile virtual machine type communication devices. In accordance with embodiments of the present invention, there is provided a method for managing a mobile object in a communication network. The method includes receiving, by a user plane gateway, at least one parameter from an access point which is in communication with a machine type communication device that detects the mobile object. The at least one parameter is indicative of at least one attribute of the mobile object. The method further includes sending, by the user plane gateway, a trajectory of the mobile object to a connectivity and mobility manager, wherein the trajectory of the mobile object is obtained based on the at least one parameter.

In some embodiments, the method further includes receiving an object mobility update trigger including one or more metrics and determining a revised trajectory based on the one or more metrics.

In accordance with embodiments of the present invention, there is provided a method for managing a mobile object using a communication network. The method includes receiving, by a connectivity and mobility manager, a trajectory of the mobile object and selecting an access point based on the trajectory, wherein the trajectory is obtained based on at least one parameter indicative of at least one attribute of the mobile object.

In some embodiments, the method further includes transmitting trigger data indicative of instructions for instantiation of a user plane gateway for association with the determined access point. In some embodiments, the method includes receiving an object-context-change trigger based indicative of a revised trajectory of the mobile object and transmitting a trigger to determine a new Point of Presence (PoP) to host a new user plane gateway for communication with a new access point that is proximate to a location along the revised trajectory of the mobile object.

In accordance with embodiments of the present invention, there is provided a system for managing a mobile object using a communication network. The system includes a user plane gateway configured to receive at least one parameter from a first access point which is in communication with a machine type communication device (MTCD) that detects the mobile object, the at least one parameter indicative of at least one attribute of the mobile object. The user plane gateway further configured to transmit a trajectory of the mobile object, wherein the trajectory is based on the at least one parameter. The system further includes a connectivity and mobility manager configured to receive the trajectory and select a second access point based on the trajectory.

In some embodiments, the system further includes a virtual machine type communication object server (vMOS) configured to maintain a database which stores one or more attributes of the mobile object. In some embodiments, the system further includes a management and orchestration (MANO) entity configured to instantiate a virtual network function (VNF) for a target user plane gateway.

According to embodiments, the network configuration can be modified on an as needed basis in order to track the movement of the mobile object, wherein this modification of the communication network can be enabled by the use of a Network Function Virtualization infrastructure.

BRIEF DESCRIPTION OF THE FIGURES

Further features and advantages of the present invention will become apparent from the following detailed description, taken in combination with the appended drawings, in which:

FIG. 1A illustrates a mobile broadband communication network configuration according to the prior art.

FIG. 1B illustrates a machine type communication network configuration according to the prior art.

It will be noted that throughout the appended drawings, like features are identified by like reference numerals.

DETAILED DESCRIPTION

As used herein, a "network" or "communication network" may service various devices including but not necessarily limited to wireless devices. Such a network may include a radio access portion and a backhaul portion. The network may further comprise various virtualized components as will become readily apparent herein. A primary example of such a network is 5G network which can be reconfigurable, for example using Network Function Virtualization.

As used herein, a "MTC object" or "object" is used to define an object or mobile object that is real or virtual, wherein the object is within the physical environment, for example a human target, vehicle, oil spill, cascading power failure, livestock, forest fire and the like. An object is detectable and/or can be acted upon by certain types of MTC devices, for example sensors, actuators, controllers and the like. In some embodiments, an MTC object or object is an object which is a non-subscriber of the communication network in question and as such the object may be considered as a virtual MTC device (MTCD).

The present invention provides a system and method for managing a mobile object using a plurality of machine type communication devices (MTCDs) communicatively connected to a communication network. A mobile object can be considered a virtual MTCD which can be managed and/or tracked by an array of MTCDs which are communicatively connected with the communication network. The MTCDs detect the mobile object and obtain or determine one or more parameters indicative of movement of the object. By tracking the movement of the object, the system can substantially ensure that there are connected MTCDs in the area to which the object is moving, thereby enabling the management and/or tracking of the mobile object can be provided by actively modifying the configuration of the communication network for example using network function virtualization.

Figure 2A:
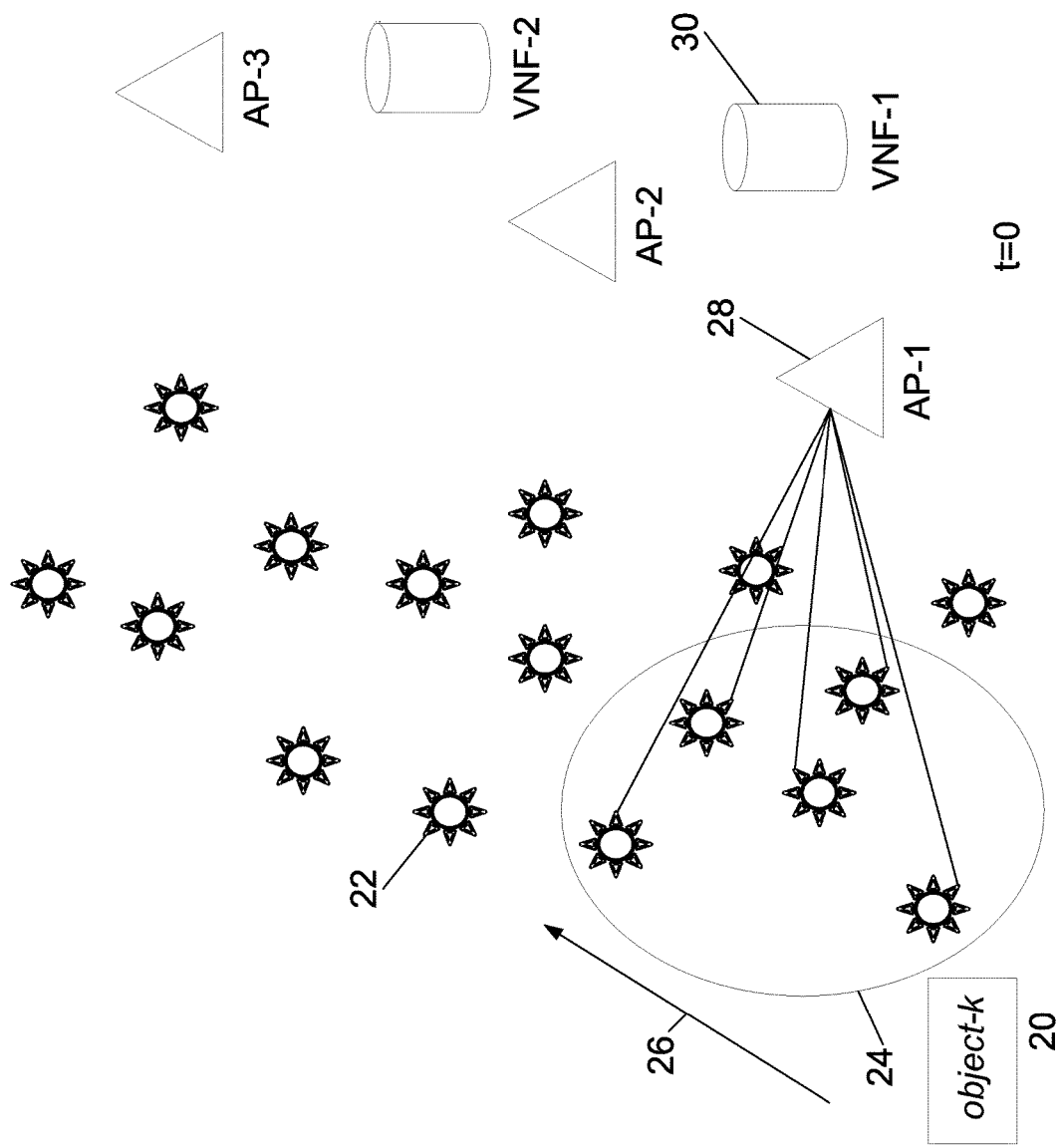
FIGS. 2A, 2B and 2C illustrate communication network configurations during tracking of a movable object, in accordance with embodiments of the present invention.

For example, with reference to FIG. 2A an object 20 is detected by a collection of MTCDs 22, which are positioned within a first region 24. The MTCDs in the first region 24, are communicatively connected to the communication network via Access Point (AP) 1 28 which is communicatively connected to a virtual service gateway configured as a Virtual Network Function 1 (VNF-1) 30. VNF-1 provides connectivity between the AP and the backbone of the communication network. The MTCDs in the first region detect one or more parameters associated with the object which indicate that the object is moving in a direction 26 as illustrated. The one or more parameters can relate to at least one attribute of the object, for example, location, speed of movement or other attribute of the object which may be used to determine the trajectory of the object. In addition, correlation between parameters received from multiple MTCDs in the first region can also be used to determine the trajectory of the object.

Figure 2B:
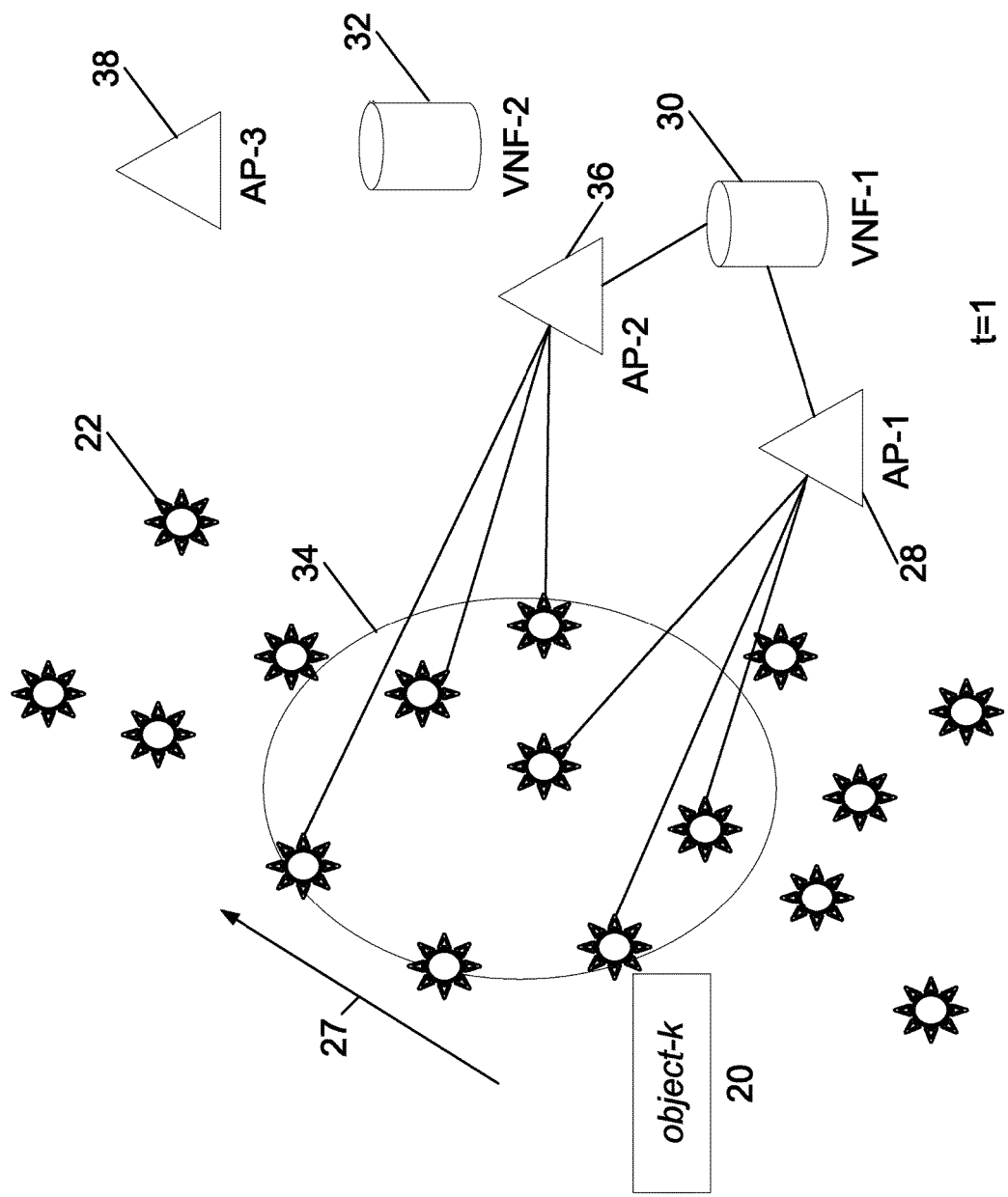

With reference to FIG. 2B, the object 20 has moved along the direction 26 and is subsequently detected by a collection of MTCDs which are positioned within a second region 34. This second region of MTCDs is communicatively connected to VNF-1 30 by either AP-2 36 or AP-1 28. The MTCDs in the second region 34 detect one or more parameters associated with the object which indicate that the object is moving in a direction 27 as illustrated. These one or more parameters transmitted by the MTCDs 22 are received by the one or more Access Points 28 to which these MTCDs are communicatively connected. Based on the detected parameter(s) of the object, the trajectory of the object can be determined and the communication network can use the determined trajectory to identify a suitable location for instantiating a second virtual service gateway configured as VNF-2 32. For example, as illustrated VNF-2 32 is proximate to AP-3 38 which may provide for connectivity of MTCDs in the proximate region where the object appears to be moving towards, for example based on the determined trajectory. In addition for example, VNF-2 32 can be instantiated by a NFV Management and Orchestration (MANO) entity associated with the communication network.

Figure 2C:
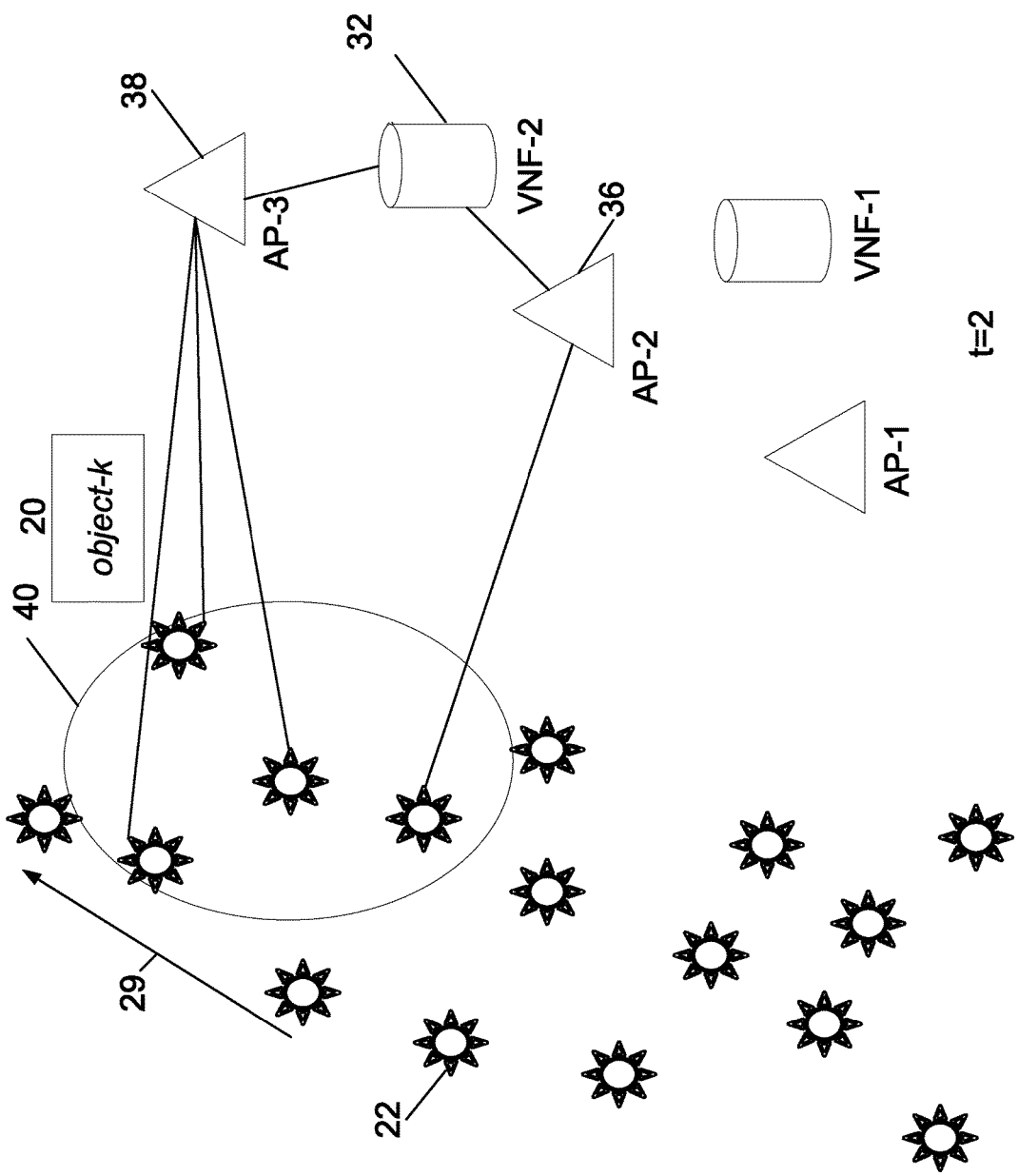

With reference to FIG. 2C, the object 20 has moved along the direction 27 and is subsequently detected by a collection of MTCDs which are positioned within a third region 40. This third region of MTCDs is communicatively connected to VNF-2 32 by either AP-2 36 or AP-3 38. The MTCDs in the third region 40 detect one or more parameters associated with the object which indicate that the object is moving in a direction 29 as illustrated. Based on the parameter(s), the communication network, for example the NFV MANO, may instantiate a further virtual service gateway to enable connectivity of other APs to ensure that the detection of the object by proximate MTCDs is provided. In this manner, by the virtual reconfiguration of the communication network, MTCDs which are proximate to the path of the object can be used for detection, management and/or tracking of the object.

According to embodiments of the present invention, the one or more object attributes/parameters which can be indicative of the trajectory of the object can include velocity, location, directional movement and the like. These attributes or parameters can be determined based on object details detected by the MTCDs which are collecting information indicative of the object. For example, if three MTCDs are capable of detecting an object, triangulation can be used to determine the location, received signal strength or intensity can provide an indication of location of the object, temporal received signal strength can provide an indication of movement and speed, and other attributes/parameters can provide details relating to the location and movement of the object as would be readily understood.

In order to provide context, according to embodiments of the present invention, the communication network architecture to which managing mobile virtual machine type communication devices configuration can be applied is based on a Network Function Virtualization (NFV) framework. The NFV framework can be used to define a plurality of virtual network functions (VNFs), each of which can correspond to a function enabling operation of a communication network. For example a VNF can provide the functions of a router, switch, gateway, firewall, load balancer, server and the like. The function is virtualized in the sense that it may utilize a set of virtual resources, such as computing, storage and networking resources, rather than utilizing dedicated hardware resources. As such, VNFs may be instantiated on an as-needed basis using available virtual resources. NFV and virtual network functions architecture is described in ETSI GS NFV 001 entitled "Network Function Virtualization (NFV); Use Cases", October 2013 and ETSI GS NFV 002 entitled "Network Function Virtualization (NFV); Architectural Framework", October 2013, for example.

The NFV Management and Orchestration (MANO) entity is used to instantiate the necessary network functional components in order to suitably provide the service indentified by a Network Service (NS) request. The instantiation of a network service request is described by a Virtual Network Function Forwarding Graph (VNFFG) which defines the set of network functions that are required to provide the requested service. The VNFFG contains a Network Forwarding Path (NFP) that defines a sequence of actions that are to be performed, for example by a collection of VNFs, to provide the requested service.

The NFV-MANO entity includes an Orchestrator function, a Virtual Network Function Manager (VNFM) function and a Virtual Infrastructure Manager (VIM) function. According to embodiments, the functionality of the Orchestrator function, VNFM function and VIM function can be as defined in ETSI GS NFV 001 and ETSI GS NFV 002, for example.

According to embodiments, the VIM function is configured to manage the Network Function Virtual Infrastructure (NFVI) which can include physical infrastructure, virtual resources and software resources in a NFV-based network. For example physical infrastructure can include servers, storage devices and the like and virtual resources can include virtual machines. According to embodiments, there can be a plurality of VIM functions instantiated within a particular NFV architecture, wherein each VIM function is responsible for the management of its respective NFVI.

According to embodiments, the VNFM function can be configured to manage the Virtual Network Functions (VNF) and can manage the lifecycle of the VNFs. For example the VNFM function can configure, instantiate and terminate VNF instances, which can be installed on virtual machines that are created and managed by the VIM function. In addition, the VNFM function can be configured to scale-up and scale-down one or more of the VNFs which can result in the scaling-up and scaling-down of the usage of the central processor(s) and memory that is providing the computational power and storage resources for the realization of the VNFs. In some embodiments, each VNFM function manages a separate VNF or a single VNFM function manages multiple VNFs.

According to embodiments the Orchestrator function can be configured to coordinate, authorize, release and engage the NFVI resources by interaction with the VIM function. The Orchestrator function further is configured to create end-to-end service between different VNFs by interaction with the VNFM function.

In accordance with embodiments of the present invention, the NFV-MANO entity further instantiate NFV management plane functions that are used to define the network topology for a Network Service (NS) request; determine the transport protocols to be used across links; and determine the physical links between different network functions used by the network service.

Figure 3:
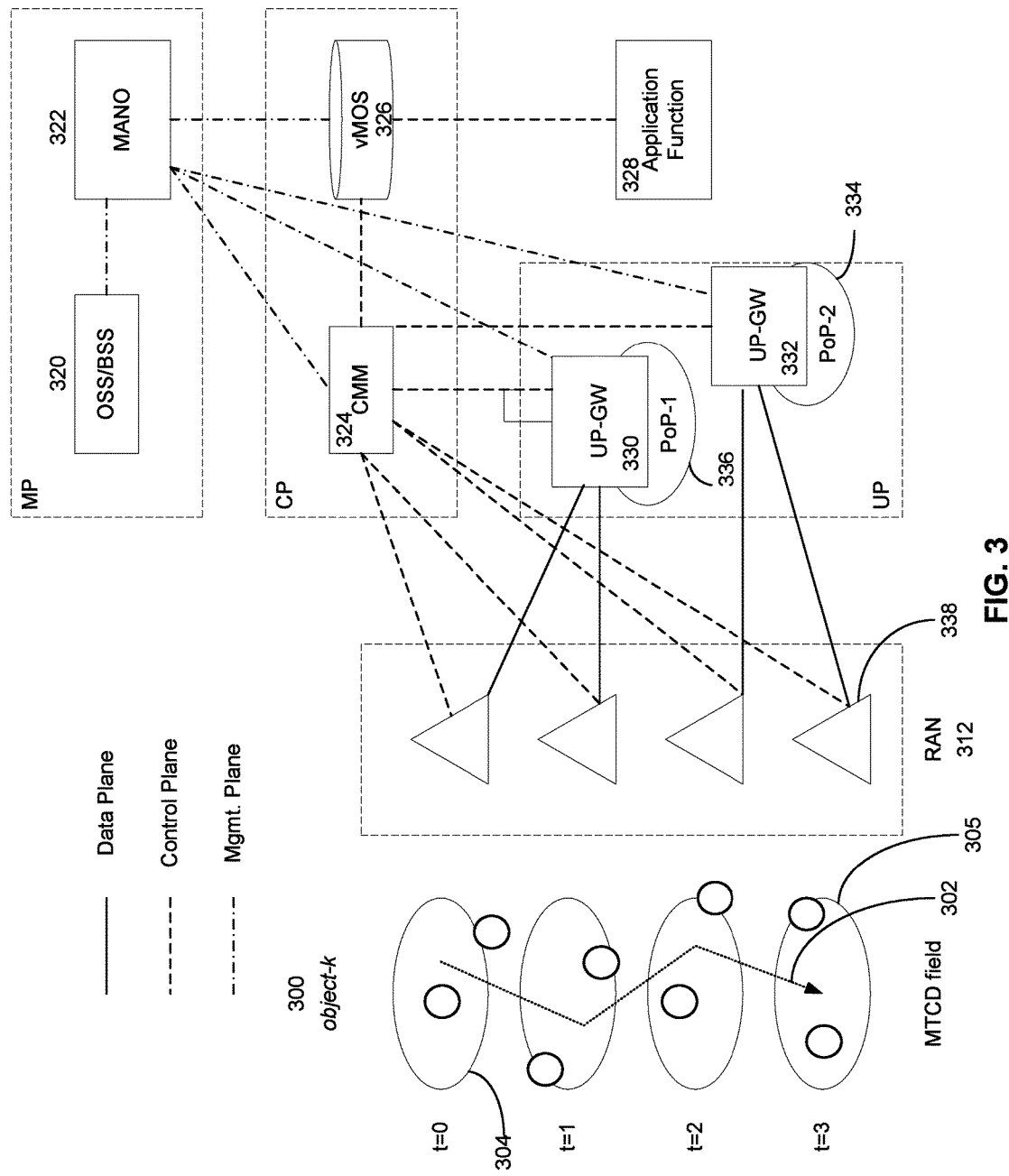
FIG. 3 illustrates a system for tracking a movable object, in accordance with embodiments of the present invention.

In light of the above discussion relating to NFV, FIG. 3 illustrates a system for managing and/or tracking a movable object, in accordance with embodiments of the present invention. The system includes a MANO 322 operatively connected with a virtual MTC Object Server (vMOS) 326, a Connectivity and Mobility Manager (CMM) 324 and an Operational Support System/Business Support System (OSS/BSS) 320. The MANO 322 is configured to instantiate the necessary UP-GW(s) 330, 332 in order to provide network connectivity proximate to one or more APs 338 which are in communication with the one or more MTCDs 305 that are tracking the object 300. In addition, the system includes an application function (AF) 328 which is configured to access the vMOS 326 and provide configuration data to the appropriate UP-GW 330, 332 indicative of parameters and attributes relating to the object. In addition, the AF 328 is configured to receive object data from the UP-GW 330, 332, wherein this object data is indicative of the data received from the MTCDs 305, via the appropriate AP 338, relating to current attributes of the object.

As the object 300 traverses through an machine type communication device (MTCD) field along path 302 which passes through various tracking regions 304, the object is detected by the MTCDs 305 which capture one or more attributes relating to the object. These attributes are relayed to the User Plane Gateway (UP-GW) 330, 332 by way of the Access Point (AP) 338 communicatively connected with the MTCDs which detect the object. According to embodiments, the UP-GW authenticates and registers the object with the vMOS 326 via the CMM 324. Once the object is registered, the location of the object is tracked by the CMM 324 along the path 302 that may pass through varying regions or zones 304 having one or more MTCDs therein. If the object crosses over from a coverage area of a first AP to a second AP within the Radio Access Network (RAN) 312, a handover procedure can be triggered in order that the suitable UP-GW is available or instantiated in advance of the pending crossover of cover areas, thereby enabling communication with the second AP and continuing tracking of the object. As would be readily understood, during the handover process, the MTCDs tracking the object may initially be in communication with both the first AP and the second AP in order to ensure that an appropriate handover of the data transmission between APs is enabled.

According to embodiments, the UP-GW is configured to perform in-network processing of the objects in order to determine the object trajectory. The UP-GW further maintains the object mobility schedule map, which can define a collection of parameters relating to the object. These parameters can include, object Identifier (ID), current MTCD(s) ID tracking the object, the AP(s) ID communicatively connected with the MTCDs and the time at which these parameters are accurate. In addition, the UP-GW further can use the collection of parameters for the object authentication and registration.

According to embodiments, the CMM is configured to select APs based on the determined trajectory of the object. The CMM is further configured to trigger the MANO when a change in the UP-GW is necessary, thereby initiating the subsequent instantiation of a VNF for a new UP-GW as necessary. In some embodiments, the CMM is configured to update the discontinuous reception (DRX) cycle of the MTCDs based on an objects determined trajectory and schedule travel. In this manner the CMM can provide a means for ensuring that an appropriate MTCD is in active mode when an object being tracked is within the detection area of the appropriate MTCD. In some embodiments, the CMM further determines a tracking area list (TAL) corresponding to the AP set that can assist with the paging of the MTCDs when they are in idle mode, thereby enabling appropriate transmission and reception of object data by the MTCDs. In some embodiments, one or more of the primary functionalities of the CMM can be configured and assigned to different functional entities. For example the session management function of the CMM can be assigned to a session management (SM) function and/or the mobility management function of the CMM can be assigned to a mobility management (MM) function.

According to embodiments, the vMOS is configured to maintain a database which stores the attributes of the objects which can include, object ID, time, location, and one or more parameters relating to the particular object. The vMOS is configured to be accessible by both the CMM and the AF, for the provision of information and details relating to the objects being tracked. In some embodiments the vMOS generates one or more object authentication metrics which can provide for the authentication of an object by the UP-GWs, upon receipt at the UP-GW of object data.

According to embodiments, the functions performed by the Operational Support System/Business Support System (OSS/BSS) 320 are as follows. The OSS can include functions that support back-office activities which aid in operating a communication network, as well as provisioning and maintaining customer services and the like. The BSS can include functions that support customer-facing activities, for example billing order management, customer relationship management, call centre automation and the like. According to embodiments, the OSS/BSS may receive and act upon a network service request for the tracking and/or management of an object.

Figure 4:
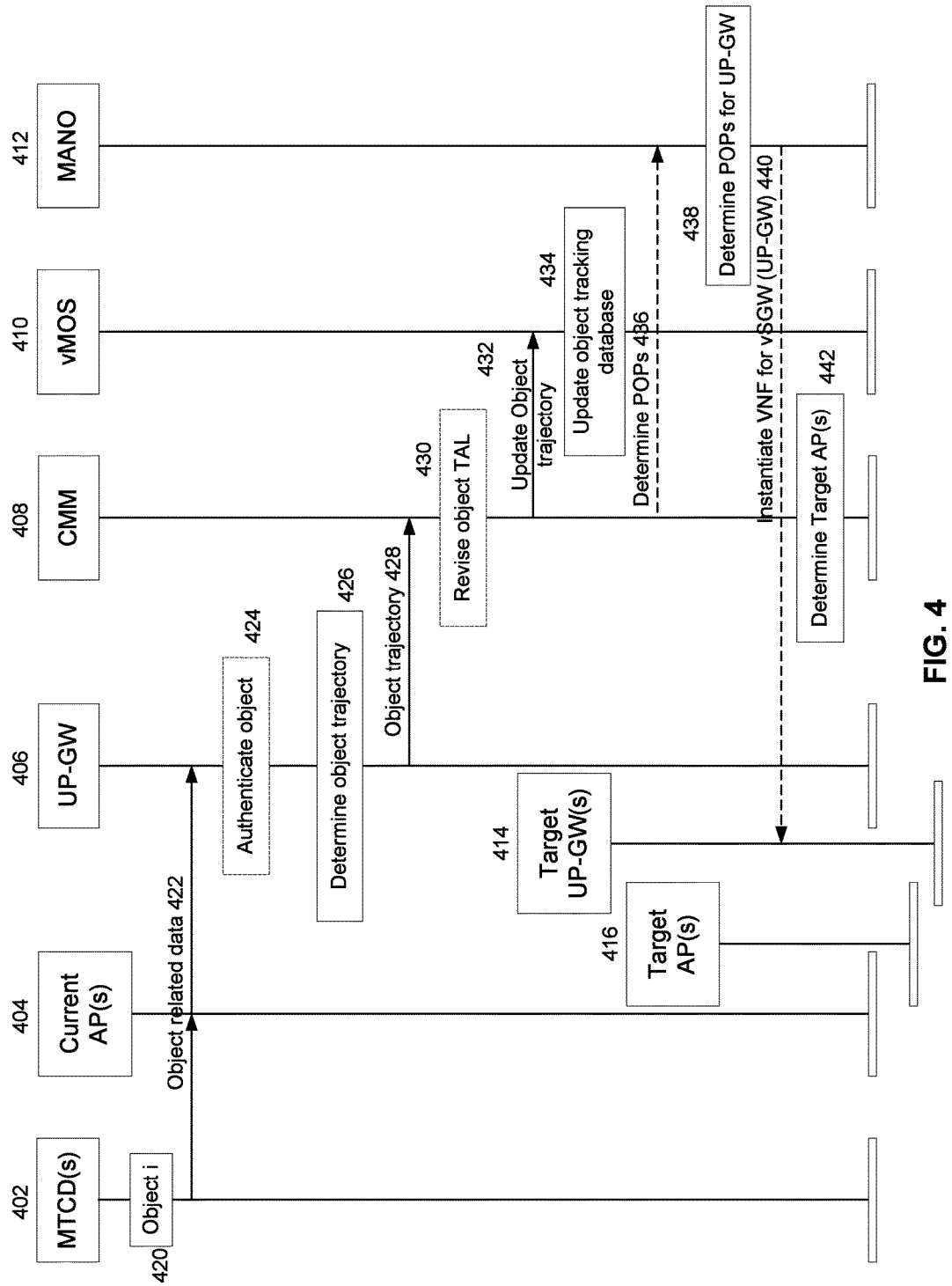
FIG. 4 illustrates a signalling flow chart illustrating a method for tracking a movable object, in accordance with embodiments of the present invention.

FIG. 4 illustrates a signalling flow chart illustrating a method for tracking a movable object, in accordance with embodiments of the present invention. An object 420 being tracked is detected by a MTCD 402 and object related data 422 is transmitted by the MTCD 402 to the AP 404 to which it is communicatively connected. The AP 404 subsequently transmits this data to the UP-GW 406 with which the AP is communicatively connected. According to some embodiments, the UP-GW is configured to authenticate 424 the object, thereby ensuring this particular object is the one that is being tracked. The UP-GW 406 determines the object trajectory 426 and transmits the determined object trajectory 428 to the CMM 408. This trajectory data is subsequently transmitted to the vMOS 410 and the object tracking database can be updated 434 if required. In some embodiments, the CMM 408 will revise the tracking area list (TAL) if the trajectory determined necessitates an update thereof. For example, the TAL can be updated if the object is moving in a direction that necessitates a change in the tracking area, namely the object may be moving from a first tracking area having a first set of MTCDs to a second tracking area having a second set of MTCDs. As would be readily understood, there may be overlap in the MTCDs which are present in the first tracking area and the second tracking area.

With further reference to FIG. 4, the CMM 408 can transmit a trigger to determine PoPs 436 to the MANO 412, wherein the PoPs are indicative of locations wherein a new virtual server gateway (UP-GW) may be instantiated, and these locations can be determined based on the object trajectory. The MANO 412 determines the PoPs for the target UP-GW(s) 414 and subsequently transmits a trigger to instantiate a VNF for the target UP-GW 414 at the determined one or more PoPs. The CMM 408 can subsequently determine target APs 442 which can be in communication with the MTCDs which are positioned along the path of the object, thereby enabling providing continued tracking of the object as it travels along the determined trajectory.

Figure 5:
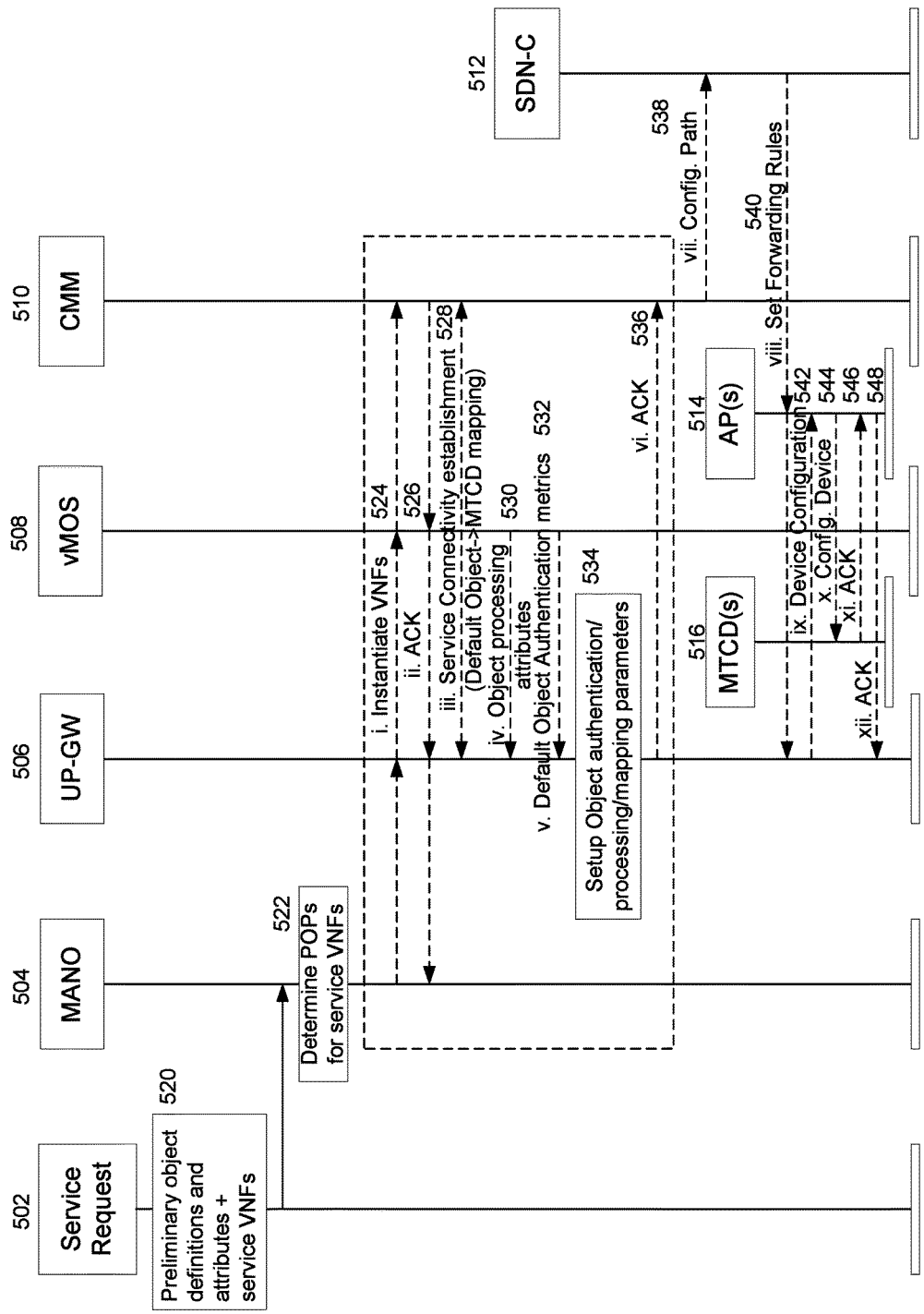
FIG. 5 illustrates a signalling flow chart illustrating a method for service setup for tracking a movable object, in accordance with embodiments of the present invention.

With reference to FIG. 5, a signalling flow chart is illustrated which shows a method for service setup for tracking a movable object, in accordance with embodiments of the present invention. A service request 502 is provided to the MANO 504, for example the service request can be provided by the OSS/BSS, and the request can contain definition of the objects which are of interest. These definitions 520 of the objects can include metrics which can provide for the authentication of the object based on a set of observable object attributes. The MANO 504 determines the PoPs 522 for the instantiation of the VNFs relating to the UP-GW 522 and instantiate triggers 524 are sent by the MANO 504 to the vMOS 508 and CMM 510 with respective acknowledgements 526 being received at the MANO. Once the service related functions 528, 530 at the UP-GW, vMOS and CMM are instantiated, the default object authentication metrics 532 are provided by the vMOS 508 to the UP-GW 506. As a portion of the service establishment, the CMM 510 can provide default object to MTCD mapping table 528 to the UP-GW. The UP-GW can update the object identification, processing or mapping parameters, or a combination thereof 534 contained thereby, and a subsequent acknowledgement 536 is sent to the CMM 510. The CMM triggers 538 the Software Defined Networking Controller (SDN-C) 512 to setup the forwarding paths 540 between the MTCDs 516, UP-GW 506 via the APs 514. After the forwarding path has been established, the MTCDs are configured 542, 544 by the UP-GW via the APs associated therewith. The configuration of the MTCDs can include device configuration including specifying DRX cycle of the MTCD based on default object travel schedule, for example arrival and departure times at particular locations, namely a location associated with the particular MTCDs. Upon configuration subsequent acknowledgements 546, 548 can be transmitted between the UP-GW, APs and MTCDs.

For context in relation to the above discussion, SDN is a network management technique that allows a network management entity (e.g. an SDN Controller) to implement an architectural framework to create intelligent programmable networks, where the control planes and the data planes can be decoupled, network intelligence and state are logically centralized, and the underlying network infrastructure is abstracted from the application.

Figure 6:
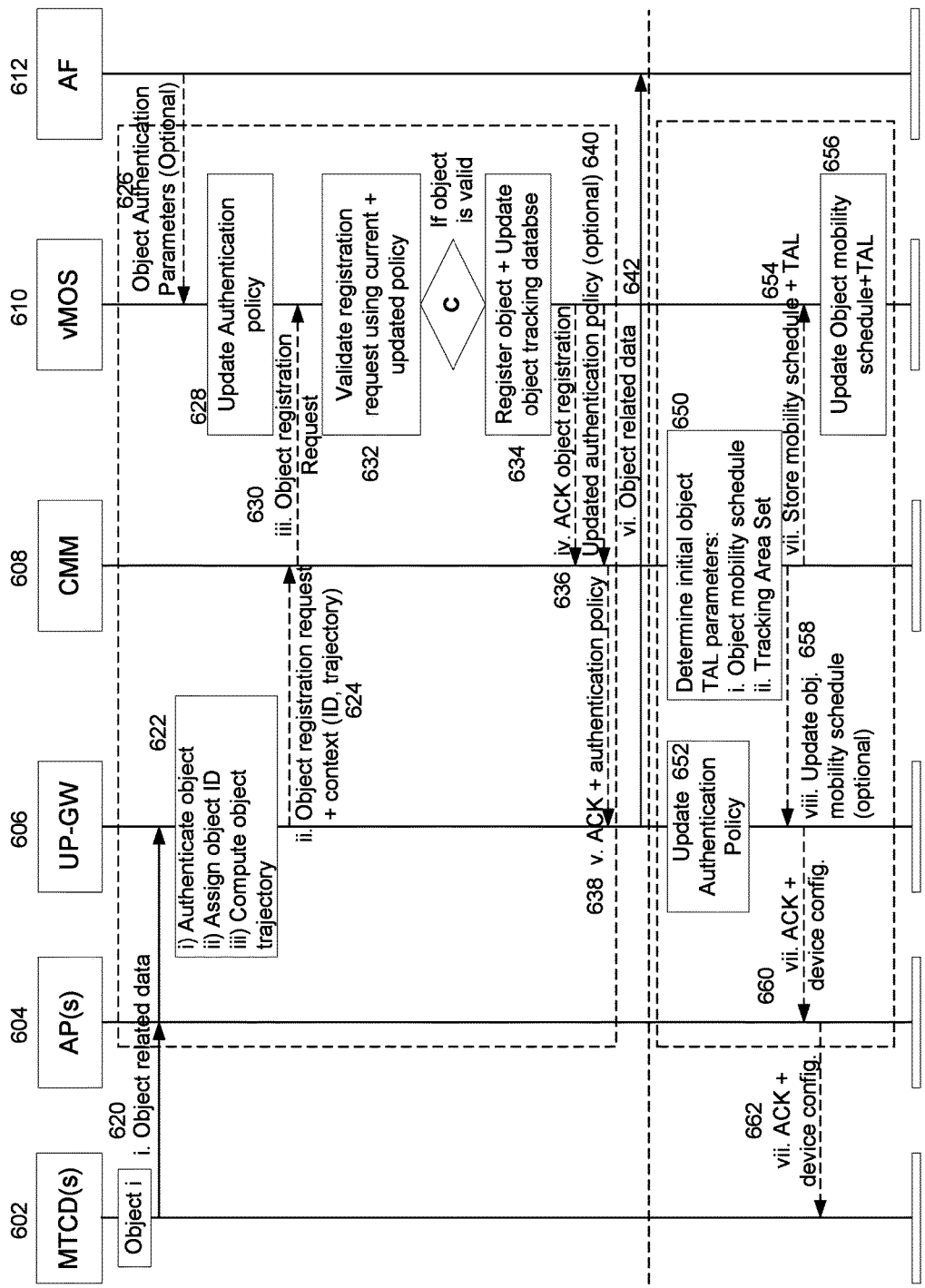
FIG. 6 illustrates a signalling flow chart of a method for authentication and registration of a movable object, in accordance with embodiments of the present invention.

FIG. 6 illustrates a signalling flow chart for a method for authentication and registration of an object in accordance with embodiments of the present invention. The UP-GW 606 receives object related data 620 and authenticates 622 the object using default authentication parameters that were provided to the UP-GW by the vMOS 610 during service setup as defined above with respect to FIG. 5. In addition the UP-GW assigns 622 an identifier to the object and determines the object trajectory and subsequently sends a registration request 624 to the CMM 608. The object registration and object context is relayed 630 to the vMOS 610. If the object context attributes received by the vMOS from the UP-GW differ from the existing attributes contained within vMOS, an updated authentication policy is used to validate the object 632. In this instance, according to embodiments, the exiting attributes may have been changed as a result of an update of the object authentication parameters 626 transmitted from the AF 612 to the vMOS 610. If the object is valid the vMOS proceeds to register 634 the object and update the object tracking database. The vMOS 610 subsequently sends an acknowledgement 636 of object registration to the CMM 608 as well as an updated authentication policy 640 if required. The CMM 608 subsequently transmits 638 same to the UP-GW 606. Object related data may subsequent be transmitted 642 from the UP-GW 606 to the AF 612. The CMM 608 further determines and updates 650 the tracking area list parameters which can include the object ID, TAL and time. The UP-GW further updates the authentication policy if required 652. The updated mobility schedule defined by the TAL parameters is transmitted 654 from the CMM 608 and subsequently stored in the vMOS 610. In some embodiments, the CMM transmits the updated object mobility schedule 658 to the UP-GW 606. As illustrated in FIG. 6 acknowledgements 660, 662 and object configuration data are transmitted to the APs 604 and MTCDs 602.

According to embodiments, when an object registers with the network the CMM will know the objects location and time, for example the objects mobility schedule, at the granularity of the tracking area. The tracking area can be determined by the CMM and can be based on the object mobility schedule, which can be determined or computed by the UP-GW. In some embodiments, in order to ensure that the data traffic from or to the object are forwarded in the uplink and downlink directions, for each entity or object to be tracked the following mapping details are provided at the respective system levels. For example, for an MTCD the parameters relate to the object ID and time range. For a UP-GW the parameters relate to the object ID, time range and AP(s) ID, wherein the AP(s) are those that are receiving object data from the MTCDs that are detecting or receiving data from the object. In addition for the CMM parameters relate to the object ID, time range and the tracking area list. In some embodiments, when the MTCD which is proximate to the object, is in idle mode and is to be paged, paging of the MTCDs in the tracking area list associated with the object is to be performed. According to embodiments an update of the tracking area can occur and be performed at the CMM when an object mobility update (OMU) is triggered based on one or more of the following: i) the MTCD detects a change in the object's mobility, for example a change in speed or direction, that is different from the existing object configuration data; ii) the UP-GW detects that the existing object mapping table is invalid; and iii) the periodic OMU timer at the MTCD or UP-GW or both, has expired.

Figure 7:
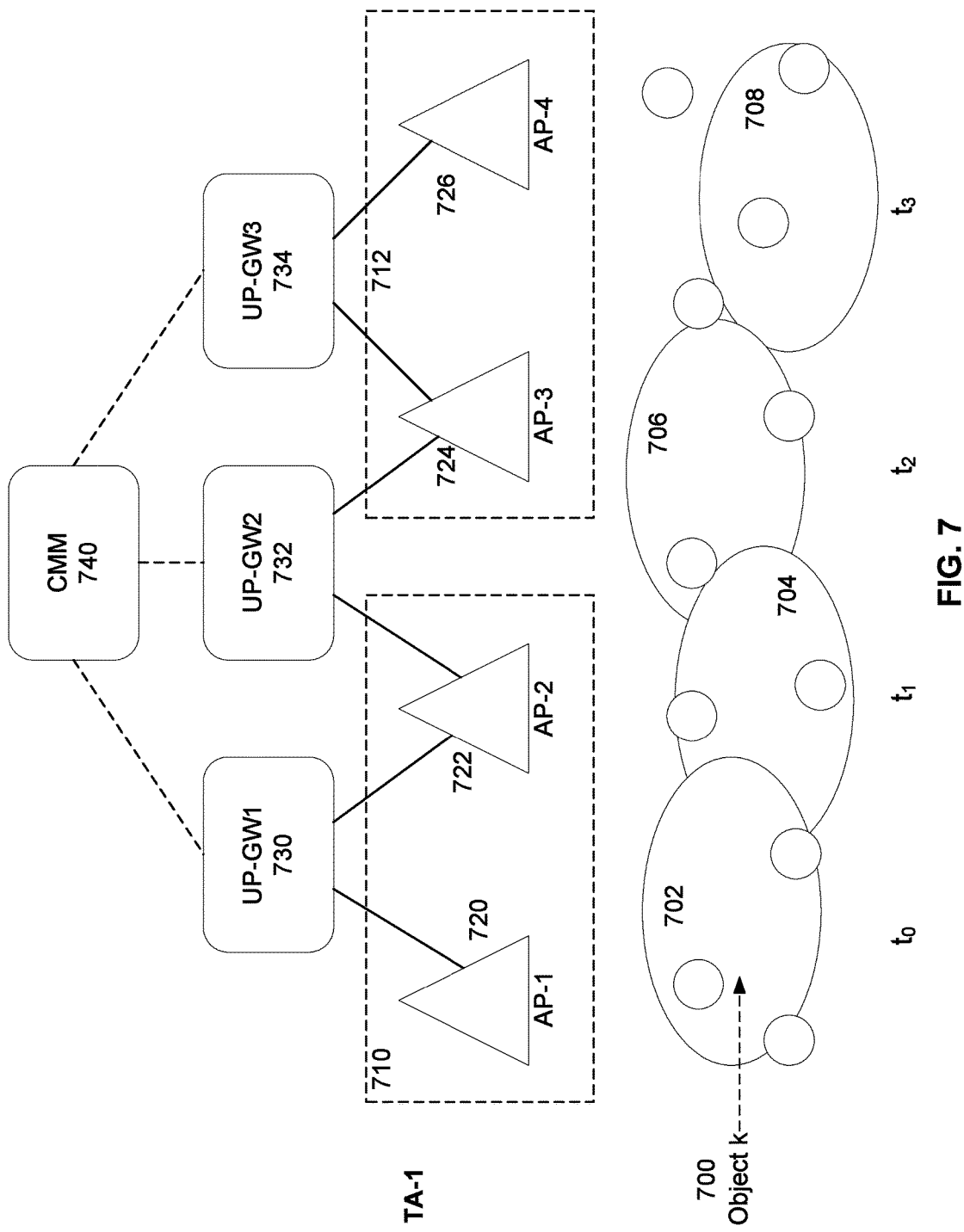
FIG. 7 illustrates mobile object tracking area management, in accordance with embodiments of the present invention.

Having regard to FIG. 7 there is illustrated a mobile object tracking area management schematic in accordance with embodiments of the present invention. As illustrated object k 700 is travelling along the trajectory which passes through the array of MTCDs 701 which may be envisioned as divided into four regions 702, 704, 706, 708 based on a time range of proximity of the object. As illustrated when the object is within regions 702, 704 the object can be detected by APs 720, 722 which are located within a first tracking area 710. As illustrated AP-1 720 is communicatively connected with UP-GW1 730 and AP-2 722 is communicatively connected with UP-GW1 730 and UP-GW2 732. When the object is within regions 704, 706 the object can be detected by APs 722, 724 which are located within the first and second tracking areas 710, 712, respectively. As illustrated AP-2 722 is communicatively connected with UP-GW1 730 and UP-GW2 732 and AP-3 724 is communicatively connected with UP-GW2 732 and UP-GW3 734. When the object is within regions 706, 708 the object can be detected by APs 724, 726 which are located within the second tracking area 712. As illustrated AP-3 724 is communicatively connected with UP-GW2 732 and UP-GW3 734 and AP-4 724 is communicatively connected with UP-GW3 734. According to embodiments, the CMM 740 is configured to ensure that the appropriate UP-GW is instantiated in order to ensure that the AP proximate thereto is capable of communication therewith when the object is within the tracking area. In this manner the setup of the communication network can be modified in real time in order to ensure the appropriate communication links are available in order to provide for the tracking of the object.

Figure 8:
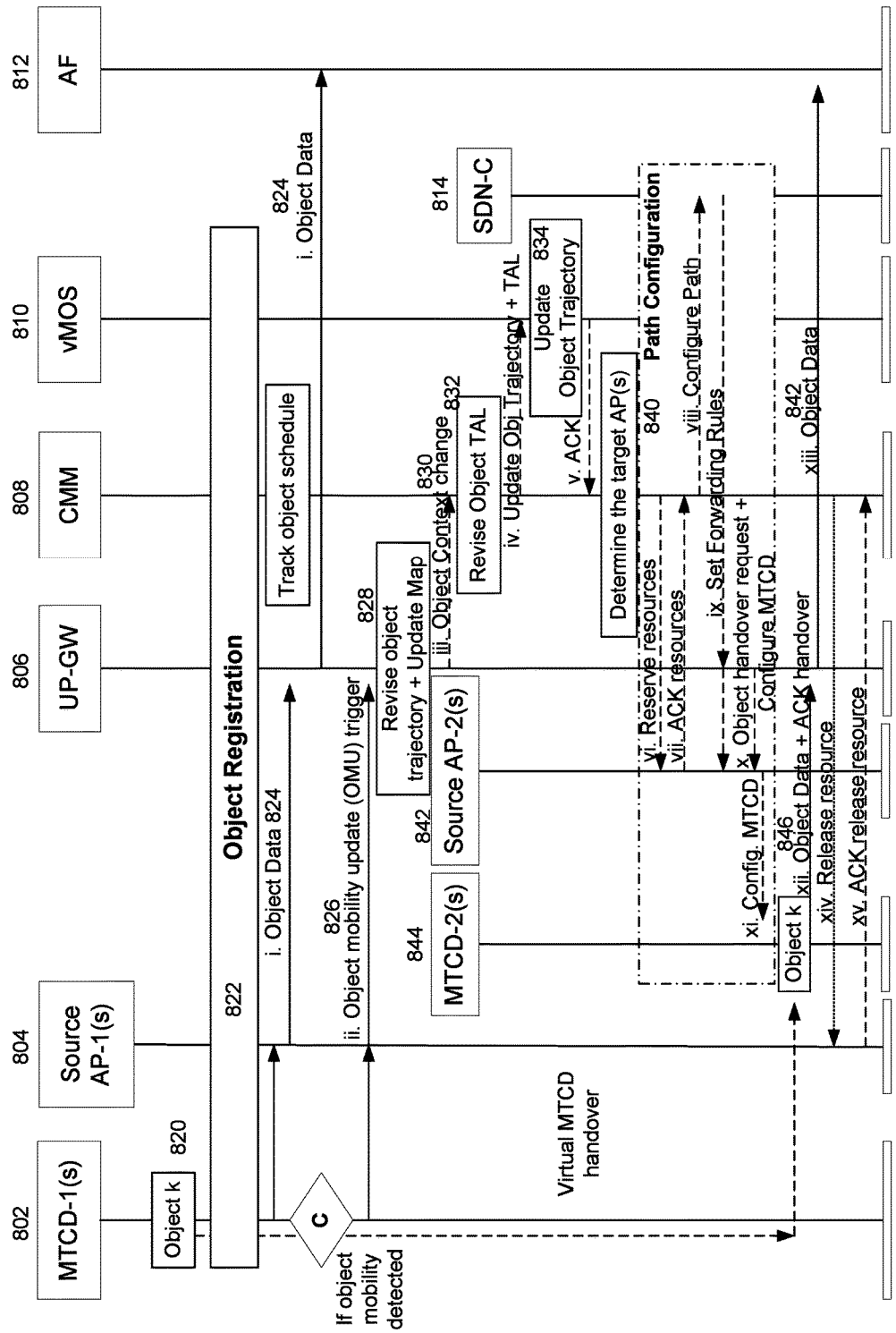
FIG. 8 illustrates a signalling flow chart for uplink communication for tracking a movable object, when the MTCD is in active mode and without requiring a change of gateways, in accordance with embodiments of the present invention.
Figure 9:
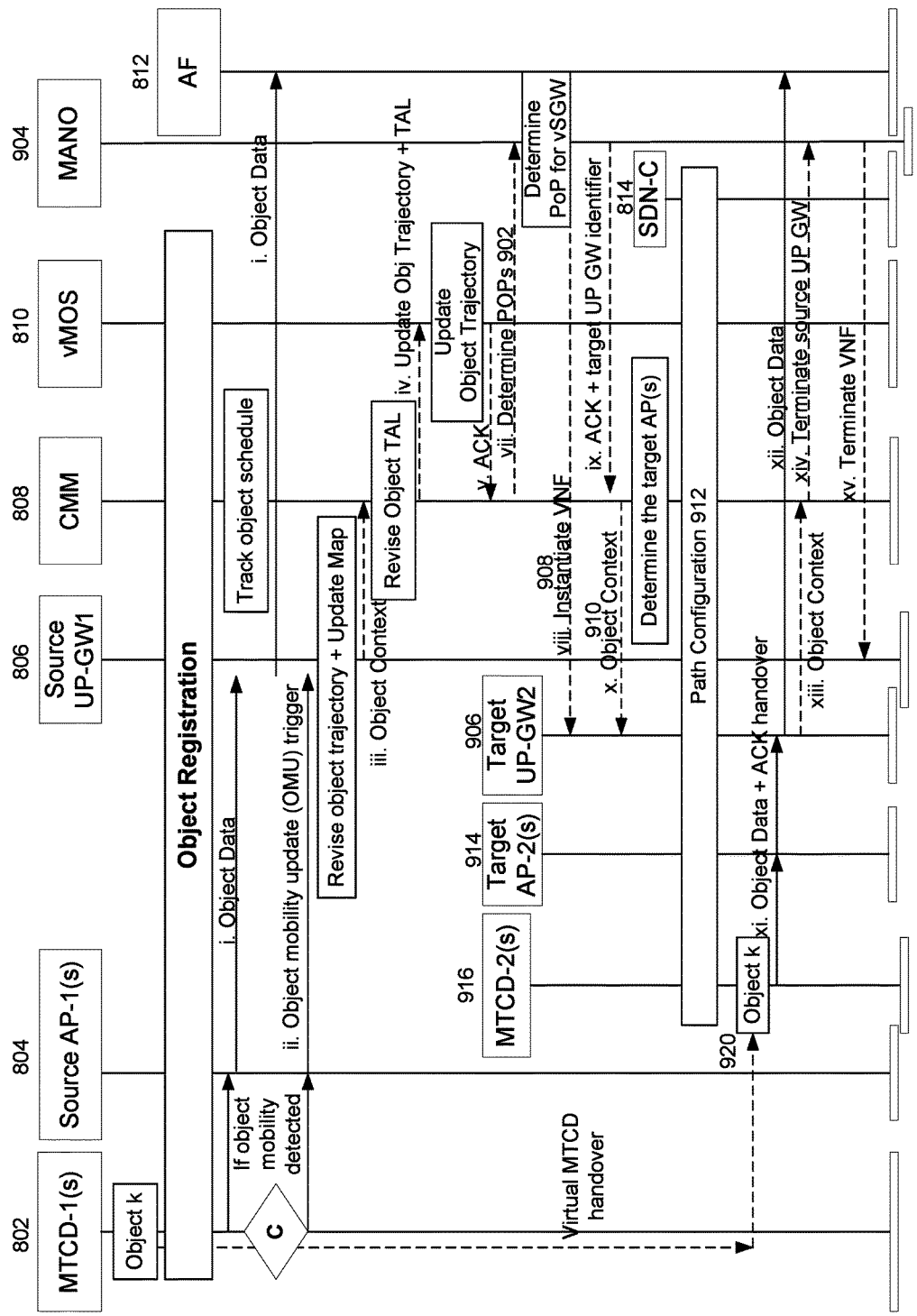
FIG. 9 illustrates a signalling flow chart for uplink communication for tracking a movable object, when the MTCD is in active mode and requiring a change of gateways, in accordance with embodiments of the present invention.

FIGS. 8 and 9 illustrate a signalling flow charts for uplink communication for tracking an object, when the MTCD is in active mode, in accordance with embodiments of the present invention. FIG. 8 illustrates the signalling flow when a change in UP-GWs is not required and FIG. 9 illustrates the signalling flow when a change in UP-GWs is required. As FIG. 8 and FIG. 9 are very similar several portions of these two figures are the same and have been discussed below with respect to reference numbers identified on FIG. 8. Upon the detection of an object 820 by an MTCD 802, the object registration procedure 822 is triggered between the MTCD 802, AP 804, UP-GW 806, CMM 808 and vMOS 810, for example as presented above with respect to FIG. 6. The object registration procedure allows for the determination of the object's trajectory and schedule which is tracked by the CMM to trigger the SDN-C for path reconfiguration if required. In the case where a new UP-GW is required, the MANO can be triggered prior to the SDN-C for determining a new PoP for the instantiation of the UP-GW. Upon successful registration of the object, the object related data 824 can be transmitted by the MTCD 802 to the AF 812 via the UP-GW 806. In the event that a deviation in the object mobility schedule is detected at the current MTCD, an object mobility update (OMU) trigger 826 is generated. The trigger may contain the metrics, for example speed, direction intensity, needed to determine a new object trajectory 828 at the UP-GW 806. The UP-GW may also update the Object-to-MTCD mapping table stored thereon to reflect the new trajectory. The new trajectory is forwarded to the CMM 808 as an object-context-change (OCC) trigger 830 and based on the updated trajectory information, the CMM 808 revises the TAL 832 of the object and the TAL is subsequently updated 834 in the vMOS 810. The CMM 808 can trigger the SDN-C to setup the forwarding path, path configuration 840, between the target APs 842 and the UP-GW based on the updated object trajectory. Object data 846 detected by the MTCD 844 can subsequently be transmitted to the AF 812 via the UP-GW 806.

In some embodiments, where the new trajectory falls outside the coverage domain of the existing (source) UP-GW 806, the CMM 808 triggers the MANO 904 to determine a new PoP 902 to host a new target UP-GW. Once the target UP-GW 906 is instantiated 908, the object context 910 is forwarded from the CMM 808 to the target UP-GW 906. Subsequently, a path configuration 912 is setup or defined, between the target UP-GW 906 and a target AP 914 which is associated with the MTCD 916 anticipated to detect the object. Upon arrival of the object 920 at the MTCD 916 anticipated to detect the object, the MTCD transmits detected object data to the target AP 914 and the uplink transmission of the object data towards the AF 812 via the target UP-GW 906 commences.

Figure 10:
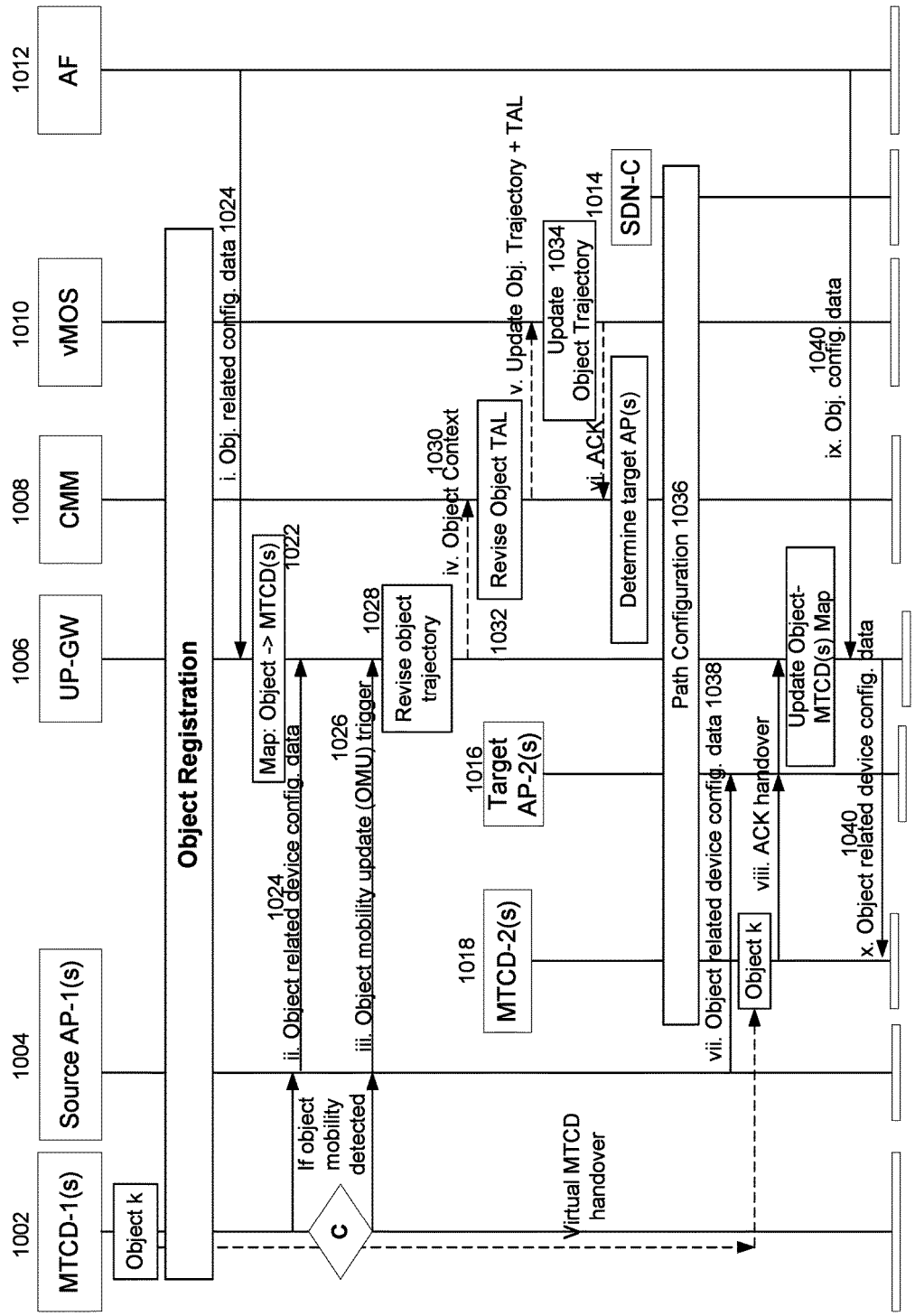
FIG. 10 illustrates a signalling flow chart for downlink communication for tracking a movable object, when the MTCD is in active mode and without requiring a change of gateways, in accordance with embodiments of the present invention.
Figure 11:
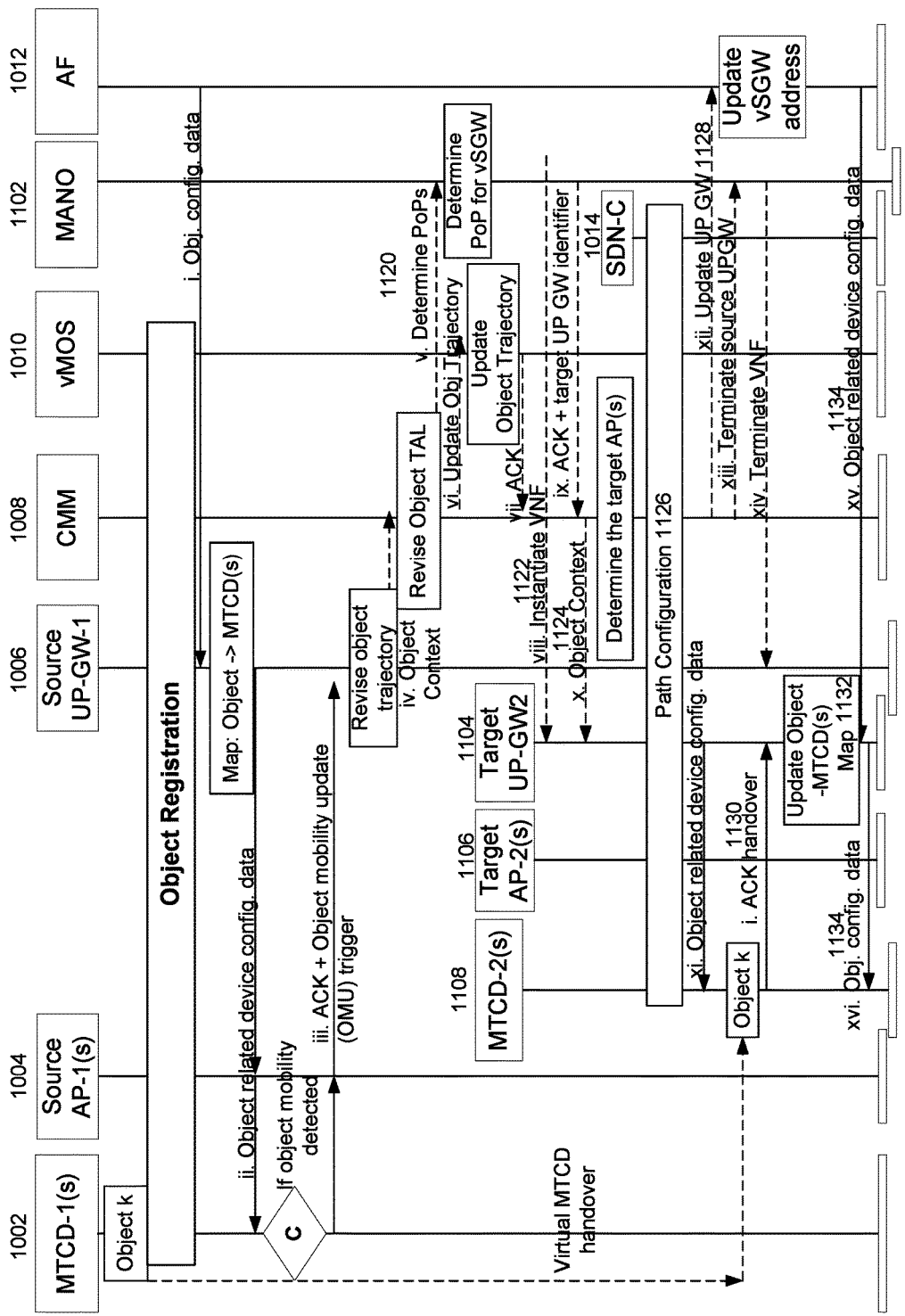
FIG. 11 illustrates a signalling flow chart for downlink communication for tracking a movable object, when the MTCD is in active mode and requiring a change of gateways, in accordance with embodiments of the present invention.

FIGS. 10 and 11 illustrate signalling flow charts for downlink communication for tracking an object, when the MTCD is in active mode, in accordance with embodiments of the present invention. FIG. 10 illustrates the signalling flow when a change in UP-GWs is not required and FIG. 11 illustrates the signalling flow when a change in UP-GWs is required. As FIG. 10 and FIG. 11 are very similar several portions of these two figures are the same and have been discussed below with respect to reference numbers identified on FIG. 10. The downlink data flow is generated from the AF 1012 to the UP-GW 1006 to the MTCD 1002 after the object has been registered 1020 by a registration procedure as defined in FIG. 6 for example. As the downlink anchor, the UP-GW determines or maps 1022 the set of MTCDs (or the equivalent APs) which are currently serving or anticipated to serve the object. The UP-GW transmits object related device configuration data 1024 to the AP and MTCD, wherein this configuration data was received from the AF. The CMM 1008 is subsequently tracking the trajectory and schedule of movement object. In the event when the object related device configuration data have to be rerouted to a new MTCD/AP set due to scheduled object mobility the SDN-C 1014 is triggered for path configuration. In the case where a new UP-GW 1006 is required, the CMM 1008 triggers the MANO 1102 prior to the SDN-C 1014 for determining a new PoP.

According to embodiments, in the event that a deviation in the object schedule is detected at the currently serving MTCD, then an OMU trigger 1026 is generated. The trigger may contain metrics indicative of for example speed, direction, intensity of the object, needed to determine the object trajectory which is used by the UP-GW 1006 to determine the new trajectory 1028 of the object. In some instances undelivered downlink data can be buffered at a source AP. The new trajectory is forwarded to the CMM 1008 as an OCC trigger 1030 and based on the new trajectory, the CMM can revise the TAL 1032 of the object which is then stored 1034 in the vMOS 1010. The CMM can trigger the SDN-C to setup or configure 1036 the forwarding path between the target APs 1016 and the UP-GW 1006 based on the new trajectory and the downlink data which was buffered at the source AP 1004 can be forwarded 1038 to the target AP 1016, for subsequent delivery to the MTCD 1018 and this delivery can include additional rerouted object related device configuration data. Subsequent object configuration data 1040 can be delivered from the AF 1012 to the target AP 1016 and MTCD 1018 via the UP-GW 1006.

In some embodiments, when the new trajectory falls outside the coverage domain of the source UP-GW, the CMM 1008 triggers 1120 the MANO 1102 to determine a new PoP to host a target UP-GW 1104. Once the target UP-GW is instantiated 1122, the object context data is forwarded 1124 from the CMM 1008 to the target UP-GW 1104. This is subsequently followed by path configuration 1126 and setup between the target UP-GW 1104 and a target AP 1106 which is associated with the MTCD 1108 anticipated to detect the object. The CMM 1008 can subsequently inform the AF 1012 of the change in the UP-GW. When the object arrives at the MTCD 1108 which is associated with the target AP 1106, the acknowledgement message 1130 from the MTCD can be used at the UP-GW to update the object to MTCD mapping table 1132. Downlink transmission of the object related data 1134 from the AF 1012 to the MTCD 1108 via the target UP-GW 1104 can subsequently proceed.

Figure 12:
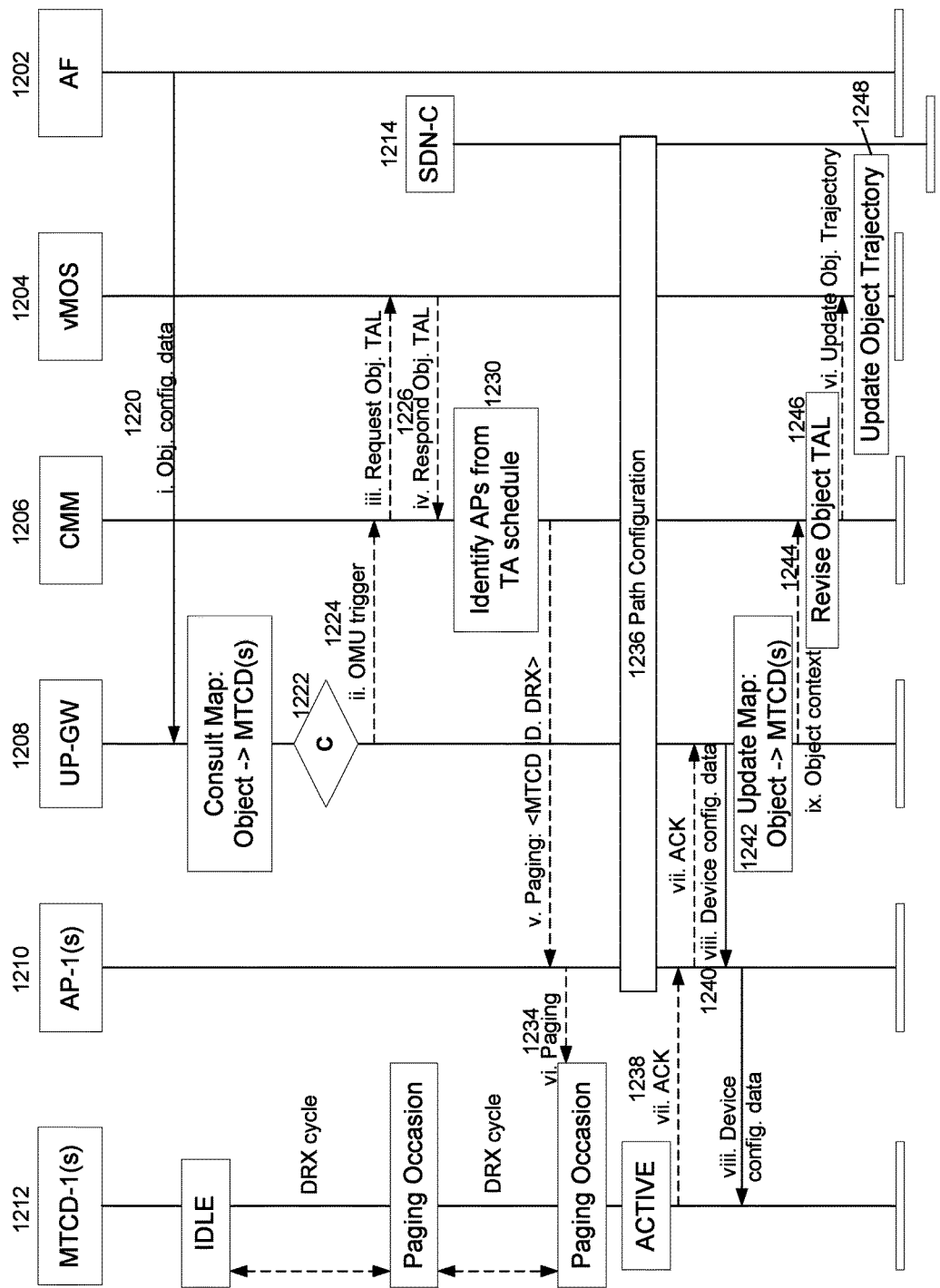
FIG. 12 illustrates a signalling flow chart for downlink communication when paging a MTCD is in idle mode for tracking a movable object, in accordance with embodiments of the present invention.

FIG. 12 illustrates a signalling flow chart for downlink communication when paging a MTCD that is in idle mode for tracking a movable object, in accordance with embodiments of the present invention. The AF 1202 send downlink object configuration data 1220 to the UP-GW 1208, which then evaluates if the object-MTCD mapping schedule is valid or invalid 1222. If it is invalid the CMM 1206 is sent a OMU trigger 1224 for a mapping update. The CMM queries 1226 the vMOS 1204 to procure the existing TAL and based on the object's schedule in the TAL the APs that can services the potential MTCDs that will detect the object are identified 1230. A paging message 1232 is forward to these determined APs 1210 along with the MTCD's DRX configuration parameter(s). The APs send a paging message 1234 to all MTCDs 1212 in the paging occasion. The path configuration 1236 is performed via the SDN-C 1214 and upon reception of an acknowledgement 1238 from the MTCDs that they are in active mode, the downlink object configuration data is forwarded 1240 to the MTCDs. The UP-GW 1208 may update 1242 the object-MTCD mapping and notify 1244 the CMM 1206 to revise the TAL 1246 and to update object trajectory 1248 at the vMOS 1204.

Figure 13:
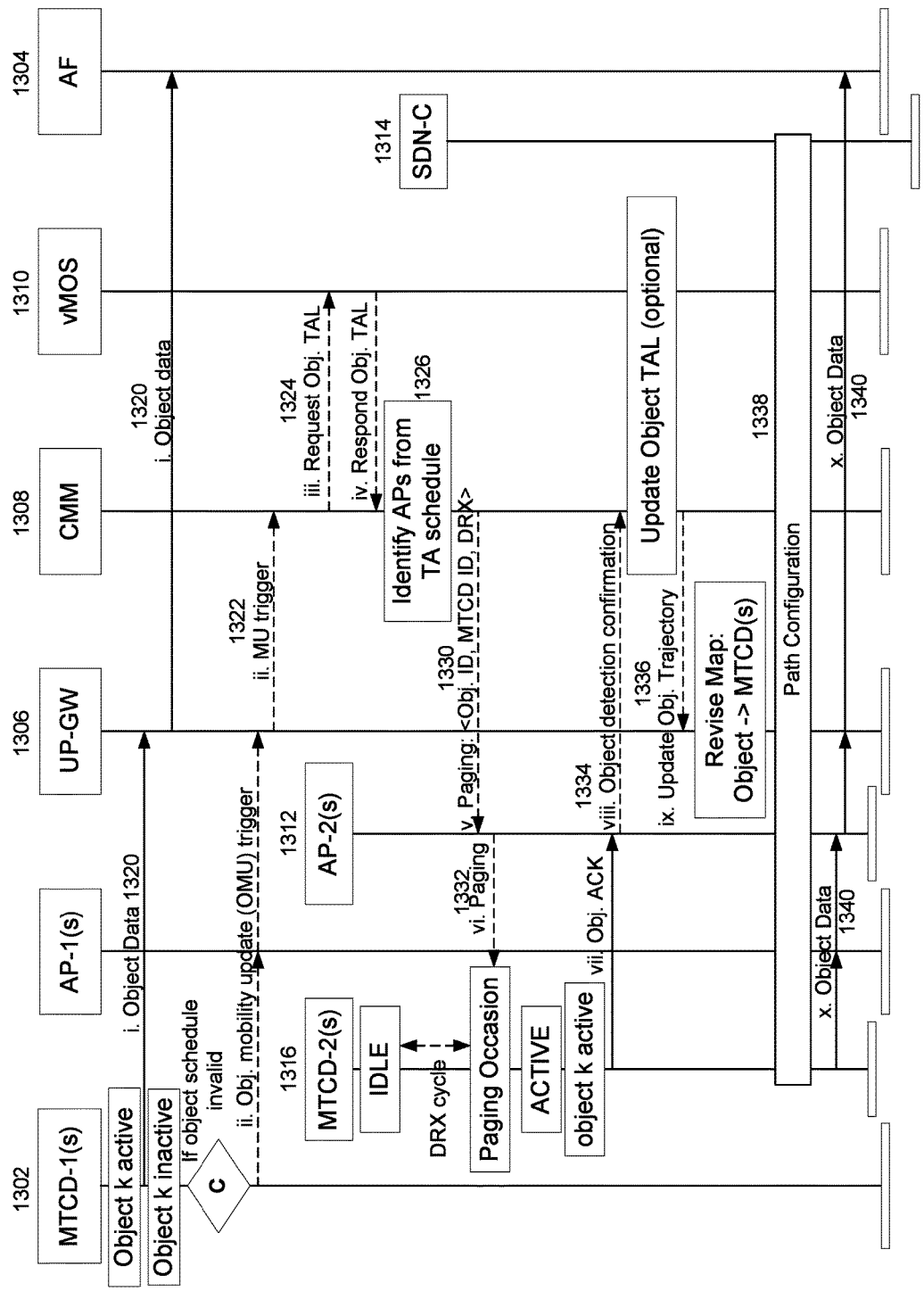
FIG. 13 illustrates a signalling flow chart for uplink communication when paging a MTCD is in idle mode for tracking a movable object, in accordance with embodiments of the present invention.

FIG. 13 illustrates a signalling flow chart for uplink communication when paging a MTCD that is in idle mode for tracking a movable object, in accordance with embodiments of the present invention. The MTCD 1302 serving the object transmits 1320 object data to the AF 1304 via the UP-GW 1306. If the object disappears from the detection range of the MTCD, a mobility update (MU) trigger 1322 is generated and relayed to the CMM 1308. The CMM queries 1324 the vMOS 1310 to procure the current TAL and based on the object's schedule in the TAL, and determines 1326 the APs serving the potential MTCDs which may detect the object are identified. A paging message 1330 is forwarded to the APs 1312 along with the MTCDs DRX configuration parameter(s) to transfer the MTCD into active mode. The APs 1312 send a paging message 1332 to all MTCDs in the paging occasion. If the object is detected at any of the paged MTCDs, an acknowledgement 1334 is generated and relayed to the CMM 1308. The CMM triggers the UP-GW 1306 to update the object to MTCD mapping 1336 and sets up or configures the forwarding path 1338 via the SDN-C 1314. Subsequently the uplink transmission of the object data 1340 commences from the MTCD 1316 to the AF 1304 via the UP-GW 1306.

It will be readily understood that, throughout the preceding discussion, the above-described network function and their operation may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 14:
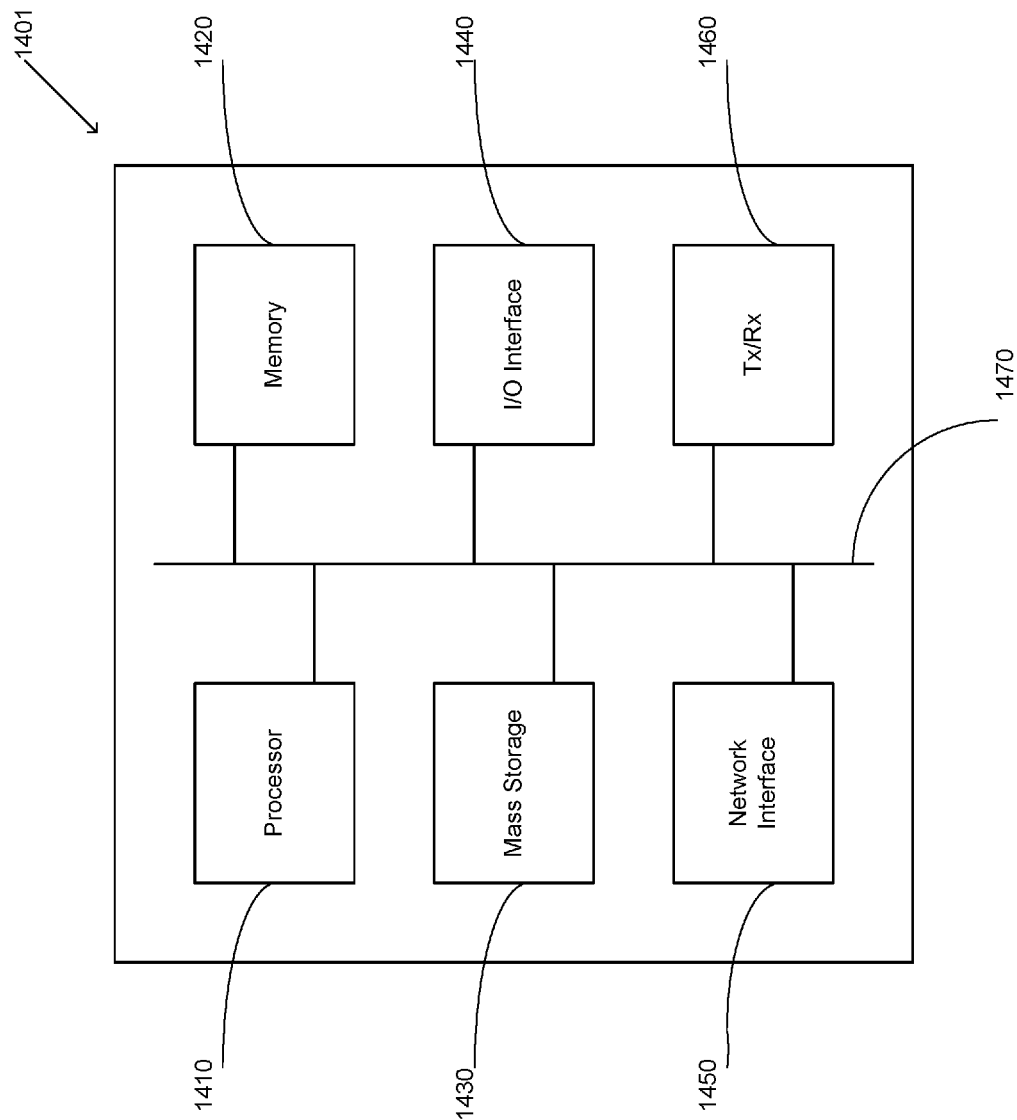
FIG. 14 illustrates a block diagram of a processing system that may be used for implementing the various network elements which may instantiate a User Plane Gateway or Communication and Mobility Manager, in accordance with embodiments of the present invention.

FIG. 14 is a block diagram of a processing system 1401 that may be used for implementing the various network elements which instantiate the functions defined herein, for example a gateway or a connectivity and mobility manager. As shown in FIG. 14, processing system 1410 includes a processor 1410, working memory 1420, non-transitory storage 1430, network interface, I/O interface 1440, and depending on the node type, a transceiver 1460, all of which are communicatively coupled via bi-directional bus 1470.

According to certain embodiments, all of the depicted elements may be utilized, or only a subset of the elements. Further, the processing system 1410 may contain multiple instances of certain elements, such as multiple processors, memories, or transceivers. Also, elements of processing system 1410 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements an instructions executable by the processor for performing the aforementioned functions and steps of plural components defined above, for example, the Global Control Plane, the Spectrum Negotiator and the Spectrum Manager.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for managing a mobile object in a communication network, the method comprising:
   receiving, by a user plane gateway (UP-GW), at least one parameter from an access point which is in communication with a machine type communication device (MTCD) that detects the mobile object, the at least one parameter indicative of at least one attribute of the mobile object;
   sending, by the UP-GW, a trajectory of the mobile object, determined in accordance with the at least one attribute of the mobile object and indicating a direction of movement of the mobile object, to a connectivity and mobility manager (CMM);
   receiving, by the UP-GW, an object mobility update trigger including one or more metrics; and
   transmitting, by the UP-GW, an object-context change trigger indicative of a revised trajectory, the revised trajectory determined in accordance with the one or more metrics, the object-context change trigger for determination of a new Point of Presence to host a new UP-GW.

2. A method for managing a mobile object in a communication network, the method comprising:
receiving, by a connectivity and mobility manager (CMM), a trajectory of the mobile object, wherein the trajectory indicates a direction of movement of the mobile object and has been determined based on at least one parameter indicative of at least one attribute of the mobile object; and
selecting, by the CMM, an access point based on the trajectory;
receiving, by the CMM, an object-context change trigger indicative of a revised trajectory of the mobile object; and
transmitting, by the CMM, a trigger to determine a new Point of Presence to host a new user plane gateway for communication with a new access point that is proximate to a location along the revised trajectory.

3. The method according to claim 2, further comprising transmitting trigger data, wherein the trigger data is indicative of instructions for instantiation of a user plane gateway for association with the selected access point.

4. The method according to claim 2, wherein the access point is selected from a tracking area list (TAL), wherein the TAL includes a plurality of MTCDs associated with the access point.

5. The method according to claim 4, further comprising transmitting instructions to update the TAL based at least in part on the trajectory of the mobile object.

6. The method according to claim 2, further comprising revising a tracking area list (TAL) in response to the revised trajectory of the mobile object.

7. The method according to claim 2, further comprising transmitting a trigger to update a stored object trajectory in response to the revised trajectory of the mobile object.

8. The method according to claim 2, further comprising transmitting a paging message that includes a MTCD identification and a MTCD discontinuous reception (DRX) configuration parameter.

9. A system for managing a mobile object using a communication network, the system comprising:
a user plane gateway configured to receive at least one parameter from a first access point which is in communication with a machine type communication device (MTCD) that detects the mobile object, the at least one parameter indicative of at least one attribute of the mobile object and the user plane gateway further configured to determine and transmit a trajectory of the mobile object, wherein the trajectory is based on the at least one parameter and indicates a direction of movement of the mobile object, the user plane gateway further configured to receive an object mobility update trigger including one or more metrics, and determine a revised trajectory based on the one or more metrics; and
a connectivity and mobility manager configured to receive the trajectory and select a second access point based on the trajectory and further configured to transmit a trigger to determine a new Point of Presence to host a new user plane gateway for communication with a new access point that is proximate to a location along the revised trajectory.

10. The system according to claim 9, further comprising a virtual machine type communication object server (vMOS) configured to maintain a database which stores one or more attributes of the mobile object.

11. The system according to claim 9, further comprising a management and orchestration (MANO) entity configured to instantiate a virtual network function (VNF) for a target user plane gateway.

12. The system according to claim 11, wherein the target user plane gateway is communicatively connected to a third access point associated with a machine type communication device (MTCD) that is positioned proximate to another location along the trajectory of the object.

* * * * *